United States Patent
Kim et al.

(10) Patent No.: US 12,155,071 B2
(45) Date of Patent: Nov. 26, 2024

(54) PARTICULATE MATERIAL, METHOD FOR ITS MANUFACTURE AND USE

(71) Applicant: BASF SE, Ludwigshafen am Rhein (DE)

(72) Inventors: Young Jin Kim, Beachwood, OH (US); James A. Sioss, Beachwood, OH (US); Tobias Maximilian Teufl, Poing (DE); Jordan K. Lampert, Cleveland, OH (US)

(73) Assignee: BASF SE, Ludwigshafen am Rhein (DE)

( * ) Notice: Subject to any disclaimer, the term of this patent is extended or adjusted under 35 U.S.C. 154(b) by 503 days.

(21) Appl. No.: 17/635,347

(22) PCT Filed: Aug. 20, 2020

(86) PCT No.: PCT/EP2020/073366
§ 371 (c)(1),
(2) Date: Feb. 14, 2022

(87) PCT Pub. No.: WO2021/037678
PCT Pub. Date: Mar. 4, 2021

(65) Prior Publication Data
US 2022/0278324 A1    Sep. 1, 2022

(30) Foreign Application Priority Data
Aug. 28, 2019  (EP) .................... 19194088

(51) Int. Cl.
*H01M 4/525* (2010.01)
*C01G 53/00* (2006.01)
*H01M 4/02* (2006.01)
*H01M 4/505* (2010.01)
*H01M 4/62* (2006.01)
*H01M 10/0525* (2010.01)

(52) U.S. Cl.
CPC ........... *H01M 4/525* (2013.01); *C01G 53/44* (2013.01); *H01M 4/505* (2013.01); *H01M 4/623* (2013.01); *H01M 4/625* (2013.01); *H01M 10/0525* (2013.01); *C01P 2002/50* (2013.01); *C01P 2004/61* (2013.01); *C01P 2006/11* (2013.01); *C01P 2006/40* (2013.01); *H01M 2004/028* (2013.01)

(58) Field of Classification Search
None
See application file for complete search history.

(56) References Cited

U.S. PATENT DOCUMENTS

| 8,021,785 B2 | 9/2011 | Wakasugi et al. | |
| 2012/0080649 A1* | 4/2012 | Koenig, Jr. | ......... C01G 53/006 |
| | | | 252/519.51 |
| 2014/0154555 A1* | 6/2014 | Endoh | ................... H01M 4/505 |
| | | | 429/150 |
| 2016/0301065 A1 | 10/2016 | Sakai | |
| 2017/0229704 A1 | 8/2017 | Takahashi et al. | |

FOREIGN PATENT DOCUMENTS

| CN | 105 047 898 B | 3/2017 | |
| EP | 3486980 A1 | 5/2019 | |
| JP | 2007091573 A * | 4/2007 | |
| JP | 201617017 A | 2/2016 | |
| JP | 2016167446 A | 9/2016 | |
| WO | WO-2015108163 A1 * | 7/2015 | ......... C01G 45/1228 |

OTHER PUBLICATIONS

Abstract of JP 2007091573A (Year: 2007).*
Abstract of WO-2015108163-A1 (Year: 2015).*
International Search Report dated Oct. 27, 2020, PCT/EP2020/073366.
Huang et al., "Enhancing the electrochemical performance of Li-rich layered oxide . . . ," Journal of Power Souches, Elseiver SA, CH, vol. 375, pp. 21-28, Dec. 5, 2017.
Zhou et al., "Cyclic performance of Li-rich layered material . . . ," Electrochimica ACTA, Elsevier, Amsterdam, HL, vol. 252, pp. 287-288, Sep. 1, 2017.
European Search Report for EP Patent Application No. 19194088.1, Issued on Feb. 11, 2020, 3 pages.

* cited by examiner

*Primary Examiner* — Gregg Cantelmo
(74) *Attorney, Agent, or Firm* — Armstrong Teasdale LLP

(57) ABSTRACT

Particulate material of the composition Li1+xTM1−xO2 wherein x is in the range of from 0.1 to 0.25 and TM is a combination of elements according to general formula (I) $(Ni_aCo_bMn_c)_{1-d}M^1_d$(I) wherein a is in the range of from 0.30 to 0.38, b being in the range of from zero to 0.05, c being in the range of from 0.60 to 0.70, and d being in the range of from zero to 0.05, $M^1$ is selected from Al, Ti, Zr, Mo, Mg, B, and combinations of at least two of the foregoing, a+b+c=1, wherein said particulate material has an average particle diameter D50 in the range of from 2 to 20 μm and wherein said particulate material has a pressed density in the range of from 2.75 to 3.1 g/cm$^3$.

12 Claims, No Drawings

PARTICULATE MATERIAL, METHOD FOR ITS MANUFACTURE AND USE

This application is a national stage filing under 35 U.S.C. § 371 of International Application No. PCT/EP2020/073366, filed on Aug. 20, 2020, which claims the benefit of priority to EP application Ser. No. 19/194,088.1, filed on Aug. 28, 2019; the disclosure of each of these applications are each incorporated herein by reference in their entirety.

The present invention is directed towards a particulate material of the composition $Li_{1+x}TM_{1-x}O_2$ wherein x is in the range of from 0.1 to 0.2 and TM is a combination of elements according to general formula (I)

$$(Ni_aCo_bMn_c)_{1-d}M^1{}_d \qquad (I)$$

wherein
a is in the range of from 0.30 to 0.38,
b being in the range of from zero to 0.05,
c being in the range of from 0.60 to 0.70, and
d being in the range of from zero to 0.05,
$M^1$ is selected from Al, Ti, Zr, Mo, Mg, B, and combinations of at least two of the foregoing, $$a+b+c=1,$$

wherein said particulate material has an average particle diameter D50 in the range of from 2 to 20 µm and wherein said particulate material has a pressed density in the range of from 2.75 to 3.2 g/cm³.

Lithiated transition metal oxides are currently being used as electrode active materials for lithium-ion batteries. Extensive research and developmental work has been performed in the past years to improve properties like charge density, specific energy, but also other properties like the reduced cycle life and capacity loss that may adversely affect the lifetime or applicability of a lithium-ion battery. Additional effort has been made to improve manufacturing methods.

Many electrode active materials discussed today are of the type of lithiated nickel-cobalt-manganese oxide ("NCM materials") or lithiated nickel-cobalt-aluminum oxide ("NCA materials").

In a typical process for making cathode materials for lithium-ion batteries, first a so-called pre-cursor is being formed by co-precipitating the transition metals as carbonates, oxides or preferably as hydroxides that may or may not be basic. The precursor is then mixed with a lithium salt such as, but not limited to LiOH, $Li_2O$ or—especially—$Li_2CO_3$—and calcined (fired) at high temperatures. Lithium salt(s) can be employed as hydrate(s) or in dehydrated form. The calcination—or firing—generally also referred to as thermal treatment or heat treatment of the precursor—is usually carried out at temperatures in the range of from 600 to 1,000° C. During the thermal treatment a solid state reaction takes place, and the electrode active material is formed. In cases hydroxides or carbonates are used as precursors the solid state reaction follows a removal of water or carbon dioxide. The thermal treatment is performed in the heating zone of an oven or kiln.

Extensive research has been performed on improvement of various properties of cathode active materials, such as energy density, charge-discharge performance such as capacity fading, and the like. However, many cathode active materials suffer from limited cycle life and voltage fade. This applies particularly to many Mn-rich cathode active materials.

In EP 3 486 980, specific high-manganese materials with a high energy density retention rate are disclosed. However, the cathode active materials disclosed suffer from a limited energy density as such.

It was therefore an objective of the present invention to provide cathode active materials with both a high energy density and a high energy density retention rate. It was further an objective to provide a process for making cathode active materials with both a high energy density and a high energy density retention rate. It was further an objective to provide applications of cathode active materials with both a high energy density and a high energy density retention rate.

Accordingly, the particulate material as defined at the outset has been found, hereinafter also defined as inventive material or as material according to the current invention. The inventive material shall be described in more detail below.

Inventive material is of the composition $Li_{1+x}TM_{1-x}O_2$ wherein x is in the range of from 0.1 to 0.2 and TM is a combination of elements according to general formula (I)

$$(Ni_aCo_bMn_c)_{1-d}M^1{}_d \qquad (I)$$

wherein
a is in the range of from 0.30 to 0.38,
b being in the range of from zero to 0.05, preferably b is zero.
c being in the range of from 0.60 to 0.70, and
d being in the range of from zero to 0.05, $$a+b+c=1,$$

$M^1$ is selected from Al, Ti, Zr, Mo, Mg, B, and combinations of at least two of the foregoing, with Al being preferred,
wherein said particulate material has a pressed density in the range of from 2.75 to 3.2 g/cm³, preferably from 2.75 to 3.1 g/cm³, more preferably from 2.80 to 3.10 g/cm³, even more preferably from 2.85 to 3.10/cm³.

Inventive materials have an average particle diameter D50 in the range of from 2 to 20 µm, preferably from 5 to 16 µm. The average particle diameter may be determined, e. g., by light scattering or LASER diffraction or electroacoustic spectroscopy. The particles are usually composed of agglomerates from primary particles, and the above particle diameter refers to the secondary particle diameter.

In one embodiment of the present invention inventive electrode active materials have a surface (BET) in the range of from 0.7 to 4.0 m²/g or even up to 6 m²/g, determined according to DIN-ISO 9277:2003-05, preferred are 1.7 to 3.8 m²/g or even from 3.0 up to 5.5 m²/g.

Some metals are ubiquitous such as sodium, calcium or zinc and traces of them virtually present everywhere, but such traces will not be taken into account in the description of the present invention. Traces in this context will mean amounts of 0.05 mol-% or less, referring to the total metal content TM.

$M^1$ may be dispersed homogeneously or unevenly in particles of inventive material. Preferably, $M^1$ is distributed unevenly in particles of inventive material, even more preferably as a gradient, with the concentration of $M^1$ in the outer shell being higher than in the center of the particles.

In one embodiment of the present invention, the inventive material is comprised of spherical particles, that are particles have a spherical shape. Spherical particles shall include not just those which are exactly spherical but also those particles in which the maximum and minimum diameter of at least 90% (number average) of a representative sample differ by not more than 10%.

In one embodiment of the present invention, the inventive material is comprised of secondary particles that are agglomerates of primary particles. Preferably, inventive material is comprised of spherical secondary particles that are agglomerates of primary particles. Even more preferably, inventive material is comprised of spherical secondary particles that are agglomerates of platelet primary particles.

In one embodiment of the present invention, said primary particles of inventive material have an average diameter in the range from 1 to 2000 nm, preferably from 10 to 1000 nm, particularly preferably from 50 to 500 nm. The average primary particle diameter can, for example, be determined by SEM or TEM. SEM is an abbreviation of scanning electron microscopy, TEM is an abbreviation of transmission electron microscopy.

In one embodiment of the present invention, the volumetric energy density is in the range of from 2,750 to 3,100 W·h/l. The VED is defined as follows: VED=$1^{st}$ cycle discharge capacity×average voltage×pressed density In one embodiment of the present invention, inventive material has a monomodal particle diameter distribution. In an alternative embodiment, inventive material has a bimodal particle diameter distribution, for example with a maximum in the range of from 3 to 6 μm and another maximum in the range of from 9 to 12 μm.

In one embodiment of the present invention, the pressed density of inventive material is in the range of from 2.75 to 3.1 $g/cm^3$, determined at a pressure of 250 MPa, preferred are 2.85 to 3.10 $g/cm^3$.

In one embodiment of the present invention, inventive material has a tap density in the range of from 1.20 to 1.80 $g/cm^3$, determined after tapping 2,000 times in a graduated cylinder.

Inventive materials are excellently suited as cathode active materials, especially since they display both a high energy density and a high energy density retention rate.

A further aspect of the present invention are electrodes comprising at least one inventive cathode active material. They are particularly useful for lithium ion batteries. Lithium ion batteries comprising at least one electrode according to the present invention exhibit a very good discharge and cycling behavior, and they show good safety behavior.

In one embodiment of the present invention, inventive cathodes contain
(A) at least one inventive material, as described above,
(B) carbon in an electrically conductive state, and
(C) a binder,
(D) a current collector.

In a preferred embodiment of the present invention, inventive cathodes contain
(A) 80 to 99% by weight inventive material,
(B) 0.5 to 19.5% by weight of carbon,
(C) 0.5 to 9.5% by weight of binder material,
percentages referring to the sum of (A), (B) and (C).

Cathodes according to the present invention contain carbon in electrically conductive modification, in brief also referred to as carbon (B). Carbon (B) can be selected from soot, active carbon, carbon nanotubes, graphene, and graphite. Carbon (B) can be added as such during preparation of electrode materials according to the invention.

Electrodes according to the present invention can comprise further components. They can comprise a current collector (D), such as, but not limited to, an aluminum foil. They further comprise a binder material (C), hereinafter also referred to as binder (C). Current collector (D) is not further described here.

Suitable binders (C) are preferably selected from organic (co)polymers. Suitable (co)polymers, i.e. homopolymers or copolymers, can be selected, for example, from (co)polymers obtainable by anionic, catalytic or free-radical (co) polymerization, especially from polyethylene, polyacrylonitrile, polybutadiene, polystyrene, and copolymers of at least two comonomers selected from ethylene, propylene, styrene, (meth)acrylonitrile and 1,3-butadiene. Polypropylene is also suitable. Polyisoprene and polyacrylates are additionally suitable. Particular preference is given to polyacrylonitrile.

In the context of the present invention, polyacrylonitrile is understood to mean not only polyacrylonitrile homopolymers but also copolymers of acrylonitrile with 1,3-butadiene or styrene. Preference is given to polyacrylonitrile homopolymers.

In the context of the present invention, polyethylene is not only understood to mean homopolyethylene, but also copolymers of ethylene which comprise at least 50 mol % of copolymerized ethylene and up to 50 mol % of at least one further comonomer, for example α-olefins such as propylene, butylene (1-butene), 1-hexene, 1-octene, 1-decene, 1-dodecene, 1-pentene, and also isobutene, vinylaromatics, for example styrene, and also (meth)acrylic acid, vinyl acetate, vinyl propionate, $C_1$-$C_{10}$-alkyl esters of (meth) acrylic acid, especially methyl acrylate, methyl methacrylate, ethyl acrylate, ethyl methacrylate, n-butyl acrylate, 2-ethylhexyl acrylate, n-butyl methacrylate, 2-ethylhexyl methacrylate, and also maleic acid, maleic anhydride and itaconic anhydride. Polyethylene may be HDPE or LDPE.

In the context of the present invention, polypropylene is not only understood to mean homopolypropylene, but also copolymers of propylene which comprise at least 50 mol % of copolymerized propylene and up to 50 mol % of at least one further comonomer, for example ethylene and α-olefins such as butylene, 1-hexene, 1-octene, 1-decene, 1-dodecene and 1-pentene. Polypropylene is preferably isotactic or essentially isotactic polypropylene.

In the context of the present invention, polystyrene is not only understood to mean homopolymers of styrene, but also copolymers with acrylonitrile, 1,3-butadiene, (meth)acrylic acid, $C_1$-$C_{10}$-alkyl esters of (meth)acrylic acid, divinylbenzene, especially 1,3-divinylbenzene, 1,2-diphenylethylene and α-methylstyrene.

Another preferred binder (C) is polybutadiene.

Other suitable binders (C) are selected from polyethylene oxide (PEO), cellulose, carboxy-methylcellulose, polyimides and polyvinyl alcohol.

In one embodiment of the present invention, binder (C) is selected from those (co)polymers which have an average molecular weight $M_w$ in the range from 50,000 to 1,000,000 g/mol, preferably to 500,000 g/mol.

Binder (C) may be cross-linked or non-cross-linked (co) polymers.

In a particularly preferred embodiment of the present invention, binder (C) is selected from halogenated (co) polymers, especially from fluorinated (co)polymers. Halogenated or fluorinated (co)polymers are understood to mean those (co)polymers which comprise at least one (co)polymerized (co)monomer which has at least one halogen atom or at least one fluorine atom per molecule, more preferably at least two halogen atoms or at least two fluorine atoms per molecule. Examples are polyvinyl chloride, polyvinylidene chloride, polytetrafluoroethylene, polyvinylidene fluoride (PVdF), tetrafluoroethylene-hexafluoropropylene copolymers, vinylidene fluoride-hexafluoropropylene copolymers (PVdF-HFP), vinylidene fluoride-tetrafluoroethylene copolymers, perfluoroalkyl vinyl ether copolymers, ethylene-tetrafluoroethylene copolymers, vinylidene fluoride-chlorotrifluoroethylene copolymers and ethylene-chlorofluoroethylene copolymers.

Suitable binders (C) are especially polyvinyl alcohol and halogenated (co)polymers, for example polyvinyl chloride or polyvinylidene chloride, especially fluorinated (co)polymers such as polyvinyl fluoride and especially polyvinylidene fluoride and polytetrafluoroethylene.

Inventive electrodes may comprise 0.5 to 9.5 by weight of binder(s) (C), referring to the sum of component (A), carbon (B) and binder (C).

A further aspect of the present invention is a battery, containing
(1) at least one cathode comprising inventive material (A), carbon (B), and binder (C),
(2) at least one anode, and
(3) at least one electrolyte.

Embodiments of cathode (1) have been described above in detail.

Anode (2) may contain at least one anode active material, such as carbon (graphite), $TiO_2$, lithium titanium oxide, silicon or tin. Anode (2) may additionally contain a current collector, for example a metal foil such as a copper foil.

Electrolyte (3) may comprise at least one non-aqueous solvent, at least one electrolyte salt and, optionally, additives.

Non-aqueous solvents for electrolyte (3) can be liquid or solid at room temperature and is preferably selected from among polymers, cyclic or acyclic ethers, cyclic and acyclic acetals and cyclic or acyclic organic carbonates.

Examples of suitable polymers are, in particular, polyalkylene glycols, preferably poly-$C_1$-$C_4$-alkylene glycols and in particular polyethylene glycols. Polyethylene glycols can here comprise up to 20 mol % of one or more $C_1$-$C_4$-alkylene glycols. Polyalkylene glycols are preferably polyalkylene glycols having two methyl or ethyl end caps.

The molecular weight $M_w$ of suitable polyalkylene glycols and in particular suitable polyethylene glycols can be at least 400 g/mol.

The molecular weight $M_w$ of suitable polyalkylene glycols and in particular suitable polyethylene glycols can be up to 5,000,000 g/mol, preferably up to 2,000,000 g/mol.

Examples of suitable acyclic ethers are, for example, diisopropyl ether, di-n-butyl ether, 1,2-dimethoxyethane, 1,2-diethoxyethane, with preference being given to 1,2-dimethoxyethane.

Examples of suitable cyclic ethers are tetrahydrofuran and 1,4-dioxane.

Examples of suitable acyclic acetals are, for example, dimethoxymethane, diethoxymethane, 1,1-dimethoxyethane and 1,1-diethoxyethane.

Examples of suitable cyclic acetals are 1,3-dioxane and in particular 1,3-dioxolane.

Examples of suitable acyclic organic carbonates are dimethyl carbonate, ethyl methyl carbonate and diethyl carbonate.

Examples of suitable cyclic organic carbonates are compounds of the general formulae (II) and (III)

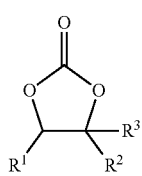

(II)

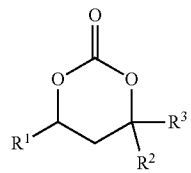

(III)

where $R^1$, $R^2$ and $R^3$ can be identical or different and are selected from among hydrogen and $C_1$-$C_4$-alkyl, for example methyl, ethyl, n-propyl, isopropyl, n-butyl, isobutyl, sec-butyl and tert-butyl, with $R^2$ and $R^3$ preferably not both being tert-butyl.

In particularly preferred embodiments, $R^1$ is methyl and $R^2$ and $R^3$ are each hydrogen, or $R^1$, $R^2$ and $R^3$ are each hydrogen.

Another preferred cyclic organic carbonate is vinylene carbonate, formula (IV).

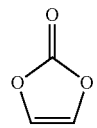

(IV)

The solvent or solvents is/are preferably used in the water-free state, i.e. with a water content in the range from 1 ppm to 0.1% by weight, which can be determined, for example, by Karl-Fischer titration.

Electrolyte (3) further comprises at least one electrolyte salt. Suitable electrolyte salts are, in particular, lithium salts. Examples of suitable lithium salts are $LiPF_6$, $LiBF_4$, $LiClO_4$, $LiAsF_6$, $LiCF_3SO_3$, $LiC(C_nF_{2n+1}SO_2)_3$, lithium imides such as $LiN(C_nF_{2n+1}SO_2)_2$, where n is an integer in the range from 1 to 20, $LiN(SO_2F)_2$, $Li_2SiF_6$, $LiSbF_6$, $LiAlCl_4$ and salts of the general formula $(C_nF_{2n+1}SO_2)_tYLi$, where m is defined as follows:
t=1, when Y is selected from among oxygen and sulfur,
t=2, when Y is selected from among nitrogen and phosphorus, and
t=3, when Y is selected from among carbon and silicon.

Preferred electrolyte salts are selected from among $LiC(CF_3SO_2)_3$, $LiN(CF_3SO_2)_2$, $LiPF_6$, $LiBF_4$, $LiClO_4$, with particular preference being given to $LiPF_6$ and $LiN(CF_3SO_2)_2$.

In a preferred embodiment of the present invention, electrolyte (3) contains at least one flame retardant. Useful flame retardants may be selected from trialkyl phosphates, said alkyl being different or identical, triaryl phosphates, alkyl dialkyl phosphonates, and halogenated trialkyl phosphates. Preferred are tri-$C_1$-$C_4$-alkyl phosphates, said $C_1$-$C_4$-alkyls being different or identical, tribenzyl phosphate, triphenyl phosphate, $C_1$-$C_4$-alkyl di-$C_1$-$C_4$-alkyl phosphonates, and fluorinated tri-$C_1$-$C_4$-alkyl phosphates, In a preferred embodiment, electrolyte (3) comprises at least one flame retardant selected from trimethyl phosphate, $CH_3$—P(O)(OCH$_3$)$_2$, triphenylphosphate, and tris-(2,2,2-trifluoroethyl)-phosphate.

Electrolyte (3) may contain 1 to 10% by weight of flame retardant, based on the total amount of electrolyte.

In an embodiment of the present invention, batteries according to the invention comprise one or more separators (4) by means of which the electrodes are mechanically separated. Suitable separators (4) are polymer films, in particular porous polymer films, which are unreactive toward metallic lithium. Particularly suitable materials for separators (4) are polyolefins, in particular film-forming porous polyethylene and film-forming porous polypropylene.

Separators (4) composed of polyolefin, in particular polyethylene or polypropylene, can have a porosity in the range from 35 to 50%. Suitable pore diameters are, for example, in the range from 30 to 500 nm.

In another embodiment of the present invention, separators (4) can be selected from among PET nonwovens filled with inorganic particles. Such separators can have a porosity in the range from 40 to 55%. Suitable pore diameters are, for example, in the range from 80 to 750 nm.

Batteries according to the invention can further comprise a housing which can have any shape, for example cuboidal or the shape of a cylindrical disk. In one variant, a metal foil configured as a pouch is used as housing.

Batteries according to the invention provide a very good discharge and cycling behavior, in particular at high temperatures (45° C. or higher, for example up to 60° C.) in particular with respect to the capacity loss.

Batteries according to the invention can comprise two or more electrochemical cells that combined with one another, for example can be connected in series or connected in parallel. Connection in series is preferred. In batteries according to the present invention, at least one of the electrochemical cells contains at least one electrode according to the invention. Preferably, in electrochemical cells according to the present invention, the majority of the electrochemical cells contain an electrode according to the present invention. Even more preferably, in batteries according to the present invention all the electrochemical cells contain electrodes according to the present invention.

The present invention further provides for the use of batteries according to the invention in appliances, in particular in mobile appliances. Examples of mobile appliances are vehicles, for example automobiles, bicycles, aircraft or water vehicles such as boats or ships. Other examples of mobile appliances are those which move manually, for example computers, especially laptops, telephones or electric hand tools, for example in the building sector, especially drills, battery-powered screwdrivers or battery-powered staplers.

Another aspect of the present invention relates to a process to manufacture inventive materials, said process also being referred to as "inventive process". The inventive process comprises the following steps:

(a) providing a particulate hydroxide, oxide or oxyhydroxide of manganese, nickel, and, optionally, at least one element of Co and $M^1$,
(b) adding a source of lithium,
(c) treating the mixture obtained from step (b) thermally,
(d) contacting the resultant lithiated oxide with a mineral acid or an aqueous solution of a compound of $M^1$ or a combination thereof,
(e) removing water,
(f) treating the resultant solid residue thermally.

The inventive process comprises six steps, (a), (b), (c), (d), (e) and (f), in the context of the present invention also referred to as step (a) and step (b) and step (c) and step (d) and step (e) and step (f), respectively. The commencement of steps (d) and (e) may be simultaneously or preferably subsequently. Steps (d) and (e) may be performed simultaneously or subsequently or, preferably, at least partially overlapping or simultaneously. During step (f), some water in the form of residual moisture may be removed as well. Step (d) is performed after completion of step (c).

The various steps will be described in more detail below.

In step (a), a particulate hydroxide, oxide or oxyhydroxide of manganese, nickel, and, optionally, at least one element of Co and $M^1$, is provided, hereinafter also referred to as "precursor". Said precursor may be obtained by co-precipitation of a hydroxide of manganese, nickel, and, optionally, at least one element of Co and $M^1$ with sodium or potassium hydroxide for example from the respective sulfates.

In one embodiment of the present invention, the precursor has a mean particle diameter D50 in the range from 2 to 20 µm, preferably 6 to 15 µm. The mean particle diameter D50 in the context of the present invention refers to the median of the volume-based particle diameter, as can be determined by light scattering, for example.

In one embodiment of the present invention, the width of the particle diameter distribution of the precursor is at least 0.61, for example 0.61 to 2, preferably 0.65 to 1.5, expressed as [(d90-d10)/(d50) diameter].

In one embodiment of the present invention, $M^1$ includes Mg in the range of from 0.1 to 2.5 mol-% per sum of metals in said precursor.

In one embodiment of the present invention, said precursor has 0.01 to 10 mol % and preferably 0.3 to 5 mol % of anions other than hydroxide or carbonate ions, based on the total number of anions, for example sulfate.

In one embodiment of the present invention, the precursor is made by combining an aqueous solution of water-soluble salts of manganese, nickel, and, optionally cobalt and $M^1$, solution ($\alpha$), with an aqueous solution of sodium or potassium hydroxide, solution ($\beta$).

The term water-soluble salts of manganese and nickel or of metals other than nickel and manganese refers to salts that exhibit a solubility in distilled water at 25° C. of 25 g/l or more, the amount of salt being determined under omission of crystal water and of water stemming from aquo complexes. Water-soluble salts of nickel, cobalt and manganese may preferably be the respective water-soluble salts of $Ni^{2+}$ and $Mn^{2+}$. Examples of water-soluble salts of nickel and manganese are the sulfates, the nitrates, the acetates and the halides, especially chlorides. Preferred are nitrates and sulfates, of which the sulfates are more preferred.

In one embodiment of the present invention, the concentration of solution ($\alpha$) can be selected within wide ranges. Preferably, the total concentration is selected such that they are within the range of, in total, 1 to 1.8 mol of the transition metals/kg of solution, more preferably 1.5 to 1.7 mol of the transition metals/kg of solution. "The transition metal salts" used herein refers to the water-soluble salts of nickel and manganese, and as far as applicable, cobalt and $M^1$, and may include salts of other metals, for example of magnesium or aluminum or transition metals other than nickel and manganese.

Another example of water-soluble salts is alum, $KAl(SO_4)_2$.

Solution ($\alpha$) may have a pH value in the range of from 2 to 5. In embodiments wherein higher pH values are desired, ammonia may be added to solution ($\alpha$). However, it is preferred to not add ammonia.

Solution ($\beta$) is an aqueous solution of sodium or potassium hydroxide. An example is potassium hydroxide and a combination of sodium and potassium hydroxide, and even more preferred is sodium hydroxide.

Solution ($\beta$) may contain some amount of carbonate, e.g., by aging of the solution or the respective alkali metal hydroxide.

The pH value of solution (β) is preferably 13 or higher, for example 14.5.

It is preferred to not use ammonia during the step of combining solutions (α) and (β).

In one embodiment of the present invention, the pH value at the end of the step of combining solutions (α) and (β) is in the range from 8 to 12, preferably 10.5 to 12.0, and more preferably 11.0 to 12.0, each measured in the mother liquor at 23° C.

In one embodiment of the present invention, the co-precipitation is performed at temperatures in the range from 10 to 85° C., preferably at temperatures in the range from 20 to 60° C.

In one embodiment of the present invention, the co-precipitation is performed under inert gas, for example a noble gas such as argon, or under $N_2$.

In one embodiment of the present invention, a slight excess of hydroxide is applied, for example 0.1 to 10 mole-%.

During combination of solutions (α) and (β) a slurry is formed. The solids may be isolated by solid-liquid-separation methods, for example decantation, filtration, and by the means of a centrifuge, filtration being preferred. A precursor is obtained. Then, the precursor is dried, for example under air at a temperature in the range of from 100 to 120° C. Preferably, the residual moisture content of the precursor is 1% by weight or below, for example 0.01 to 0.5% by weight.

In step (b), a source of lithium is added to the precursor. To perform step (b) of the inventive process, the procedure may be, for example, to mix precursor with at least one lithium compound selected from $Li_2O$, LiOH and $Li_2CO_3$, water of crystallization being neglected in the context of the present invention. Preferred source of lithium is $Li_2CO_3$.

To perform step (b), the amounts of precursor and source of lithium are selected so as to obtain the stoichiometry of the desired inventive material. Preferably, precursor and source of lithium compound(s) are selected such that the molar ratio of lithium to the sum of all transition metals and any M is in the range from 1.275:1 to 1.42:1, preferably 1.30:1 to 1.38:1, even more preferably 1.32:1 to 1.36:1.

Step (b) may be performed, e.g., in a plough-share mixer, or a tumble mixer. For laboratory scale experiments, roller mills may be applied as well.

To perform step (c) of the inventive process, the mixture obtained according to step (c) is being calcined at a temperature in the range of from 650 to 1000° C., preferably 875 to 950° C.

Step (c) of the inventive process can be performed in a furnace, for example in a rotary tube furnace, in a muffle furnace, in a pendulum furnace, in a roller hearth furnace or in a push-through furnace. Combinations of two or more of the aforementioned furnaces are possible as well.

Step (c) of the inventive process can be performed over a period of 30 minutes to 24 hours, preferably 3 to 12 hours. Step (c) can be effected at a temperature level, or a temperature profile can be run.

In one embodiment of the present invention, step (c) is being performed in an oxygen-containing atmosphere. Oxygen-containing atmosphere includes an atmosphere of air, of pure oxygen, of mixtures from oxygen with air, and of air diluted with an inert gas such as nitrogen. In step (c), preferred is an atmosphere of oxygen or oxygen diluted with air or nitrogen and a minimum content of oxygen of 21 vol.-%.

In one embodiment of the present invention, between steps (b) and (c) at least one pre-calcining step (c*) is being performed. Step (c*) comprises heating the mixture obtained in step (b) at a temperature in the range of from 300 to 700° C. for a period of 2 to 24 hours.

During the temperature changes, a heating rate of 1 K/min up to 10 K/min can be obtained, preferred is 2 to 5 K/min.

After step (c), it is preferred to cool down the material obtained to ambient temperature.

In step (d), said particulate material is treated with a mineral acid or an aqueous solution of a compound of $M^1$ or a combination thereof, preferably a solution of an inorganic aluminum compound. Said aqueous solution may have a pH value in the range of from 1 up to 8, preferably at least 2, more preferably from 2 to 7. It is observed that at the end of step (d), the pH value of the aqueous phase is preferably in the range of from 3 to 6.

Examples of mineral acids are nitric acid and in particular sulphuric acid, for example in a concentration of 0.01 M to 2 M, preferably 0.1 to 1.5 M.

It is preferred that the water hardness of said aqueous solution used in step (d) is at least partially removed, especially the calcium. The use of desalinized water is preferred.

Such compound of $M^1$ should be readily soluble in water. "Readily soluble" in this context means a solubility of at least 10 g compound of $M^1$/l water at 25° C.

Examples of suitable aluminum compounds are $Al_2(SO_4)_3$, $KAl(SO_4)_2$, and $Al(NO_3)_3$.

Examples of suitable titanium compounds are $Ti(SO_4)_2$, An example of a suitable zirconium compound is zirconium nitrate, empirical formula $Zr(NO_3)_4$.

Examples of suitable compounds of molybdenum are $MoO_3$, $Na_2MoO_4$, and $Li_2MoO_4$.

Examples of suitable compounds of magnesium are $MgSO_4$, $MgCl_2$ and $Mg(NO_3)_2$.

An example of a suitable boron compound is boric acid, empirical formula $H_3BO_3$.

In one embodiment, the amount of compound of $M^1$ is in the range of from 0.01 to 5.0 mol-%, referring to TM, preferred are 0.1 to 2.0 mol-%.

In one embodiment of the present invention, said treatment is carried out with a solution of a compound of $M^1$ in a mineral acid, for example a solution of $Al_2(SO_4)_3$ in aqueous $H_2SO_4$.

The treatment in step (d) may be performed by adding the mineral acid or the solution of $M^1$ to the cathode active material of step (c) and allowing the resultant mixture to interact. Such inter-action may be enhanced by stirring.

In one embodiment of the present invention, step (d) is performed at a temperature in the range of from 5 to 85° C., preferred are 10 to 60° C. Ambient temperature is particularly preferred.

In one embodiment of the present invention, step (d) is performed at normal pressure. It is preferred, though, to perform step (d) under elevated pressure, for example at 10 mbar to 10 bar above normal pressure, or with suction, for example 50 to 250 mbar below normal pressure, preferably 100 to 200 mbar below normal pressure.

In one embodiment of the present invention, step (d) is performed in a filter device with stirrer, for example a pressure filter with stirrer or a suction filter with stirrer.

The duration of treatment of the material obtained from step (c) with compound of $M^1$ may be in the range of from 2 to 60 minutes, preferred are 10 to 45 minutes.

In one embodiment of the present invention, the volume ratio of material obtained from step (c) to mineral acid or solution of compound of $M^1$, respectively, is in the range of from 1:1 to 1:10, preferably 1:1 to 1:5.

In one embodiment of the present invention, steps (d) to (e) are performed in the same vessel, for example in a filter device with stirrer, for example a pressure filter with stirrer or a suction filter with stirrer.

In one embodiment of the present invention, step (d) is repeated, for example once to 10 times. In preferred embodiments, step (d) is performed only once.

In step (e), water is removed. Said water removal may be by evaporation or preferably by solid-liquid separation methods, for example by decantation of by any type of filtration, for example on a band filter or in a filter press. Step (e) may include complete or partial removal of water, a partial removal being preferred. Together with water, mineral acid and/or non-deposited compound of $M^1$ and or lithium salt may be removed. A residue is obtained that may contain 0.01 to 5% by weight residual moisture.

In one embodiment of the present invention, filter media may be selected from ceramics, sintered glass, sintered metals, organic polymer films, non-wovens, and fabrics.

In step (f), said residue is treated thermally.

Step (f) may be carried out in any type of oven, for example a roller hearth kiln, a pusher kiln, a rotary kiln, a pendulum kiln, or—for lab scale trials—in a muffle oven.

The temperature of the thermal treatment according to step (f) may be in the range of from 150 to 290 or from 300 to 500° C.

The temperature of 300 to 500° C. corresponds to the maximum temperature of step (f).

It is possible to subject the material obtained from step (e) directly to step (f). However, it is preferred to increase the temperature stepwise, or to ramp up the temperature, or to dry the material obtained after step (e) at first at a temperature in the range of from 40 to 80° C. before subjecting it to step (f).

Said step-wise increase or ramping up may be performed under normal pressure or reduced pressure, for example 1 to 500 mbar.

Step (f)—at its maximum temperature—may be performed under normal pressure.

In one embodiment of the present invention, step (f) is carried out under an oxygen-containing atmosphere, for example air, oxygen-enriched air or pure oxygen.

In embodiments wherein a drying at a temperature in the range of from 100 to 250° C. prior to step (f) is performed such drying may be performed with a duration of from 10 minutes to 12 hours.

In one embodiment of the present invention, step (f) is carried out under an atmosphere with reduced $CO_2$ content, e.g., a carbon dioxide content in the range of from 0.01 to 500 ppm by weight, preferred are 0.1 to 50 ppm by weight. The $CO_2$ content may be determined by, e.g., optical methods using infrared light. It is even more preferred to perform step (f) under an atmosphere with a carbon dioxide content below detection limit for example with infrared-light based optical methods.

In one embodiment of the present invention step (f) has a duration in the range of from 1 to 10 hours, preferably 90 minutes to 6 hours.

In one embodiment of the present invention, the lithium content of an electrode active material is reduced by 1 to 5% by weight, preferably 2 to 4%. Said reduction mainly affects the so-called residual lithium.

By carrying out the inventive process, electrode active materials are obtained with excellent electrochemical properties. Without wishing to be bound by any theory, we assume that the extra aluminum may lead to scavenging lithium compounds deposited at the surface of the electrode active material.

Without wishing to be bound by any theory, we assume that the inventive process leads to an alteration of the surface of particles of the inventive material.

The inventive process may comprise additional—optional—steps, for example rinsing steps after step (e), or sieving steps after step (f).

The present invention is further illustrated by working examples.

General remarks: Percentages are percent by weight unless specifically noted otherwise.

ICP: inductively couple plasma

The pressed densities were determined at 250 MPa.

I. Synthesis of Inventive Materials

I.1 Synthesis of Precursors

All co-precipitations were carried out under an atmosphere of $N_2$.

I.1.1 Synthesis of TM-OH.1, Step (a.1)

A stirred tank reactor was filled with deionized water and tempered to 45° C. Then, a pH value of 11.3 was adjusted by adding an aqueous sodium hydroxide solution.

The co-precipitation reaction was started by simultaneously feeding an aqueous transition metal sulfate solution and aqueous sodium hydroxide solution at a flow rate ratio of 1.9, and a total flow rate resulting in an average residence time of 12 hours. The transition metal solution contained Ni and Mn at a molar ratio of 1:2 and a total transition metal concentration of 1.65 mol/kg. The aqueous sodium hydroxide solution was a 50 wt. % sodium hydroxide solution. The pH value was kept at 11.3 by the separate feed of the aqueous sodium hydroxide solution. Beginning with the start-up of all feeds, mother liquor was removed continuously. After 29 hours all feed flows were stopped. The mixed transition metal (TM) oxyhydroxide precursor was obtained by filtration of the resulting suspension, washing with distilled water, drying at 120° C. in air and sieving. A precursor TM-OH.1 was obtained, average particle diameter (D50) 6 μm.

I.1.2 Synthesis of TM-OH.2, Step (a.2)

The protocol of I.1 was essentially followed but ammonia was added in the beginning, 18 g of ammonium sulfate per kg of water. During co-precipitation, a 28 wt. % ammonium hydroxide solution was fed at a flow rate ratio of 0.09 (per sodium hydroxide solution). A precursor TM-OH.2 was obtained, average particle diameter (D50) 6 μm.

I.2 Synthesis of Non-Treated Cathode Active Materials, Steps (b) and (c)

I.2.1 Synthesis of a Base Material BM.1

The precursor TM-OH.1 was mixed with $Li_2CO_3$ in a Li/(TM) molar ratio of 1.15. The resultant mixture was heated to 970° C. and kept for 5 hours in a forced flow of a mixture of 20% oxygen and 80% nitrogen (by volume). After cooling to ambient temperature, the powder was deagglomerated and sieved through a 32 μm mesh to obtain a base material BM.1. The surface area (BET) was 1.42 m²/g, the pressed density: 2.92 g/cm³.

I.2.2 Synthesis of a Base Material BM.2

The precursor TM-OH.1 was mixed with $Li_2CO_3$ in a Li/(TM) molar ratio of 1.14. The resultant mixture was heated to 875° C. and kept for 5 hours in a forced flow of a mixture of 20% oxygen and 80% nitrogen (by volume). After cooling to ambient temperature, the powder was deagglomerated and sieved through a 32 μm mesh to obtain a base material BM.1. The surface area (BET) was 1.94 m²/g, the pressed density: 2.88 g/cm³.

I.2.3 Synthesis of a Base Material BM.3

The precursor TM-OH.2 was mixed with $Li_2CO_3$ in a Li/(TM) molar ratio of 1.14. The resultant mixture was heated to 925° C. and kept for 5 hours in a forced flow of a mixture of 20% oxygen and 80% nitrogen (by volume). After cooling to ambient temperature, the powder was deagglomerated and sieved through a 32 μm mesh to obtain a base material BM.3. The surface area (BET) was 1.14 m²/g, the pressed density: 2.99 g/cm³.

I.2.4 Synthesis of a Base Material BM.4

The precursor TM-OH.2 was mixed with $Li_2CO_3$ in a Li/(TM) molar ratio of 1.17. The resultant mixture was heated to 950° C. and kept for 5 hours in a forced flow of a mixture of 20% oxygen and 80% nitrogen (by volume). After cooling to ambient temperature, the powder was deagglomerated and sieved through a 32 μm mesh to obtain a base material BM.4. The surface area (BET) was 1.11 m²/g, the pressed density: 3.08 g/cm³.

I.2.5 Synthesis of a Base Material BM.5

The precursor TM-OH.1 was mixed with $Li_2CO_3$ in a Li/(TM) molar ratio of 1.16. The resultant mixture was heated to 950° C. and kept for 5 hours in a forced flow of a mixture of 20% oxygen and 80% nitrogen (by volume). After cooling to ambient temperature, the powder was deagglomerated and sieved through a 32 μm mesh to obtain a base material BM.5. The surface area (BET) was 1.36 m²/g, the pressed density: 3.05 g/cm³.

I.3 Treatment of Base Material with Mineral Acid, Step (d), Removal of Water, Step (e), and Thermal Treatment, Step (f)

I.3.1 Basic Protocol

General method, step (d.1): A tank reactor with a magnetic stirrer was charged with one kg of BM.1. 25.5 g of $Al_2(SO_4)_3$ were dissolved in 4l of 0.1 M $H_2SO_4$, diluted with one l of water and added to the BM.1. The resultant slurry was stirred for 30 minutes at ambient temperature, step (d.1).

Then, the liquid phase was removed by filtration, step (e.1).

The filter cake was rinsed with 4 liters of water.

Step (f.1): The resultant filter cake was dried first dried in vacuo at 120° C. for 12 hours and then thermally treated in an electrical furnace at 400° C. in an atmosphere of 60% by volume of oxygen (rest: nitrogen) for 5 hours and then cooled down to ambient temperature and sieved through a 32 μm mesh to obtain inventive material CAM.1 was obtained.

In Table 1, the process parameters are summarized. In Table 2, physical and chemical analytical parameters are summarized.

TABLE 1

| | process parameters | | | | | | |
|---|---|---|---|---|---|---|---|
| Base | Step (d) | | | | | | |
| material | $Al_2(SO_4)_3$ [g] | $H_2SO_4$ [l] | $H_2O$ [l] | Step € | Rinsing | Step (f) | product |
| BM.1 | 25.5 | 0.1M, 4 | 1 | (e.1) | 4 l | (f.1) | CAM.1 |
| BM.2 | 38.2 | zero | 1 | (e.1) | 3.5 l | (f.1) | CAM.2 |
| BM.3 | zero | 0.4M, 2 l | 1 | (e.1) | 4 l | (f.1) | CAM.3 |
| BM.4 | 25.5 | 0.1M, 4 l | 1 | (e.1) | 4 l | (f.1) | CAM.4 |
| BM.5 | 12.7 | 0.2M, 2 l | 1 | (e.1) | 4 l | (f.1) | CAM.5 |

II. Testing of Cathode Active Material

II.1 Electrode Manufacture, General Procedure

Positive electrode: PVDF binder (Solef® 5130) was dissolved in NMP (Merck) to produce a 10 wt. % solution. For electrode preparation, binder solution (3.5 wt. %), graphite (KS6, 2 wt. %), and carbon black (Super C65, 2 wt.-%) were suspended in NMP. After mixing using a planetary centrifugal mixer (ARE-250, Thinky Corp.; Japan), either any of inventive CAM.1 to CAM.5 or a comparative cathode active material (92.5 wt. %) was added and the suspension was mixed again to obtain a lump-free slurry. The solid content of the slurry was adjusted to 62.3%. The slurry was coated onto Al foil using a Erichsen auto coater. Prior to further use, all electrodes were calendered. The thickness of cathode material was 38 μm, corresponding to 9 mg/cm². All electrodes were dried at 105° C. for 12 hours before battery assembly.

II..2 Electrolyte Manufacture

A base electrolyte composition was prepared containing 1M $LiPF_6$, 1:4 (w/w) fluoroethylene carbonate:diethyl carbonate.

II..3 Coin-Type Half Cell Manufacture

Coin-type half cells (20 mm in diameter and 3.2 mm in thickness) comprising a cathode prepared as described under II.1 and lithium metal as working and counter electrode, respectively, were assembled and sealed in an Ar-filled glove box. In addition, the cathode and anode and a separator were superposed in order of cathode//separator//Li foil to produce a half coin cell. Thereafter, 0.15 mL of the EL base 1 which is described above (III.2) were introduced into the coin cell.

IV. Evaluation of Cell Performance

Evaluation of Coin Half-Cell Performance

Cell performance were evaluated using the produced coin type battery. For the battery performances, initial capacity and reaction resistance of cell were measured.

The initial performance and cycle were measured as follows: Coin half cells according to II.3 were tested in a voltage range between 4.8 V to 2.0 V at room temperature. For the initial cycles, the initial lithiation was conducted in the CC-CV mode, i.e., a constant current (CC) of 0.067 C was applied until reaching 0.01 C. After 5 min resting time, reductive lithiation was carried out at constant current of 0.067 C up to 2.0 V. The results are summarized in Table 2.

TABLE 2 physical and chemical analytical parameters of base materials and inventive materials

| Material | ppm Al | Surface BET [m²/g] | Pressed density [g/cm³] | 1$^{st}$ cycle DC [mA · h/g] | 1$^{st}$ cycle CE [%] | VED [W · h/l] |
|---|---|---|---|---|---|---|
| BM.1 | Zero | 1.42 | 2.92 | 239 | 80 | 2620 |
| CAM.1 | 2,200 | 3.04 | 2.97 | 265 | 90 | 2915 |
| BM.2 | Zero | 1.94 | 2.88 | 217 | n.d. | 2305 |
| CAM.2 | 3,200 | 3.70 | 2.86 | 234 | n.d. | 2425 |
| BM.3 | Zero | 1.14 | 2.99 | 201 | 78 | 2270 |
| CAM.3 | Zero | 1.95 | 2.99 | 249 | 88 | 2790 |
| BM.4 | Zero | 1.11 | 3.08 | 224 | 75 | 2587 |
| CAM.4 | 2,200 | 3.27 | 3.04 | 263 | 88 | 2976 |
| BM.5 | Zero | 1.36 | 3.05 | 240 | 81 | 2748 |
| CAM.5 | 870 | 3.64 | 3.08 | 265 | 90 | 3055 |

DC: discharge capacity
CE: Coulombic efficiency
VED: Volumetric energy density
n.d.: not determined CAM.2 displayed a 1$^{st}$ cycle charge capacity of 262 mA·h/g compared to BM.2 with 248 mA·h/g.

BM.1, BM.2, BM.3, BM.4 and BM.5 each serve as comparative materials.

The invention claimed is:

1. A particulate material with a composition $Li_{1+x}TM_{1-x}O_2$,
wherein x ranges from 0.1 to 0.2 and TM is a combination of elements according to general formula (I)

$$(Ni_aCo_bMn_c)_{1-d}M^1{}_d \quad (I)$$

wherein
a ranges from 0.30 to 0.38,
b ranges from zero to 0.05,
c ranges from 0.60 to 0.70, and
0≤d0.05,
M$^1$ is chosen from Al, Ti, Zr, Mo, Mg, B, and combinations of at least two of the foregoing, $$a+b+c=1,$$

wherein the particulate material has an average particle diameter D50 ranging from about 2 μm to about 20 μm, and
wherein the particulate material has a pressed density ranging from about 2.75 g/cm³ to 3.2 g/cm³, as determined at a pressure of 250 MPa.

2. The particulate material according to claim 1, wherein b is zero and wherein M$^1$ is enriched in an outer part of the particles of the particulate material.
3. The particulate material according to claim 1, wherein M$^1$ is Al.
4. The particulate material according to claim 1, wherein a volumetric energy density ranges from about 2,750 W·h/l about 3,100 W·h/l, and wherein a volumetric energy density is determined as 1$^{st}$ cycle discharge capacity×average voltage×pressed density.
5. The particulate material according to claim 1, wherein the pressed density ranges from about 2.85 g/cm³ to about 3.10 g/cm³, as determined at a pressure of about 250 MPa.
6. A process for manufacturing a particulate material according to claim 1, wherein the process comprises:
(a) providing a particulate hydroxide, oxide or oxyhydroxide of manganese, nickel, and, optionally, at least one of Co and M$^1$, and made by coprecipitation with sodium hydroxide or potassium hydroxide as a base,
(b) adding a source of lithium,
(c) treating a mixture obtained from step (b) thermally generating a resultant lithiated oxide,
(d) contacting the resultant lithiated oxide with a mineral acid or an aqueous solution of a compound of M$^1$ or a combination thereof,
(e) removing water generating a resultant solid residue, and
(f) treating the resultant solid residue thermally.
7. The process according to claim 6, wherein step (c) is performed at a maximum temperature ranging from about 650° C. to about 1000° C.
8. The process according to claim 6, wherein step (e) is performed by a solid-liquid separation step.
9. The process according to claim 6, wherein step (f) is performed at a temperature ranging from about 300 ° C. to about 500° C.
10. The process according to claim 6, wherein steps (d) and (e) are performed simultaneously.
11. An electrode comprising:
(A) at least one particulate material according to claim 1,
(B) carbon in electrically conductive form, and
(C) a binder.
12. A secondary battery comprising:
(1) at least one electrode according to claim 11,
(2) at least one anode, and
(3) an electrolyte.

* * * * *